United States Patent
Majima

(10) Patent No.: US 9,821,811 B2
(45) Date of Patent: Nov. 21, 2017

(54) IDLING STOP CONTROL DEVICE

(71) Applicant: Toyota Jidosha Kabushiki Kaisha, Toyota-shi, Aichi-ken (JP)

(72) Inventor: Hiroshi Majima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 47 days.

(21) Appl. No.: 15/051,269

(22) Filed: Feb. 23, 2016

(65) Prior Publication Data

US 2016/0251017 A1    Sep. 1, 2016

(30) Foreign Application Priority Data

Feb. 26, 2015 (JP) .................. 2015-036969

(51) Int. Cl.
*B60W 30/192* (2012.01)
*F02N 11/08* (2006.01)
(Continued)

(52) U.S. Cl.
CPC .......... *B60W 30/192* (2013.01); *B60W 10/06* (2013.01); *B60W 20/40* (2013.01); *B60W 30/025* (2013.01); *F02N 11/0818* (2013.01); *F02N 11/0825* (2013.01); *F02N 11/0862* (2013.01); *B60W 2510/244* (2013.01); *B60W 2520/04* (2013.01); *F02N 11/087* (2013.01); *F02N 2200/061* (2013.01);
(Continued)

(58) Field of Classification Search
CPC .. B60W 30/192; B60W 30/025; B60W 20/40; B60W 10/06; B60W 2510/244; B60W 2520/04; F02N 11/0862; F02N 11/0818; F02N 11/0825; F02N 11/087; F02N 2200/061; F02N 2200/102; Y02T 10/48; Y10S 903/905

See application file for complete search history.

(56) References Cited

U.S. PATENT DOCUMENTS

| 8,482,382 B2* | 7/2013 | Lickfelt | B60R 25/04 307/10.1 |
| 8,639,407 B2* | 1/2014 | Hardy | B60K 37/06 315/77 |

(Continued)

FOREIGN PATENT DOCUMENTS

| JP | 2005-335504 A | 12/2005 |
| JP | 2008-285124 A | 11/2008 |

(Continued)

*Primary Examiner* — Rodney Butler
*Assistant Examiner* — Frederick Brushaber
(74) *Attorney, Agent, or Firm* — Dinsmore & Shohl LLP

(57) ABSTRACT

An electronic control device automatically stops an engine operation when a remaining electric power amount index value is equal to or larger than an engine stop permission threshold. The device automatically restarts the engine operation when the remaining electric power amount index value is smaller than an engine restart threshold after the engine operation is automatically stopped. The device changes the engine stop permission threshold from a first threshold, which has been set until a start of an activation of an electric actuator, to a second threshold, which is larger than the first threshold, when the automatic engine stop is not carried out and the activation of the actuator is detected.

4 Claims, 8 Drawing Sheets

(51) Int. Cl.
*B60W 10/06* (2006.01)
*B60W 30/02* (2012.01)
*B60W 20/40* (2016.01)

(52) U.S. Cl.
CPC ......... *F02N 2200/102* (2013.01); *Y02T 10/48* (2013.01); *Y10S 903/905* (2013.01)

(56) References Cited

U.S. PATENT DOCUMENTS

| | | | |
|---|---|---|---|
| 8,909,399 B2* | 12/2014 | Kato | B60K 6/365 180/65.265 |
| 2004/0212338 A1* | 10/2004 | Shimizu | H02H 7/0851 318/469 |
| 2005/0264247 A1 | 12/2005 | Buma et al. | |
| 2012/0072063 A1* | 3/2012 | Kato | B60K 6/445 701/22 |
| 2013/0030633 A1* | 1/2013 | Yamamoto | B60W 10/08 701/22 |
| 2013/0261859 A1* | 10/2013 | Sugimoto | B60W 20/40 701/22 |
| 2014/0039744 A1 | 2/2014 | Morisaki | |
| 2014/0163800 A1* | 6/2014 | Watanabe | B60K 6/445 701/22 |

FOREIGN PATENT DOCUMENTS

| | | |
|---|---|---|
| JP | 2008-289229 A | 11/2008 |
| JP | 2009-132325 A | 6/2009 |
| JP | 2010-091496 A | 4/2010 |
| JP | 2014-173454 A | 9/2014 |
| WO | 2012/137329 A1 | 10/2012 |

* cited by examiner

IDLING STOP CONTROL DEVICE

CROSS-REFERENCE TO RELATED APPLICATIONS

This application claims priority to Japanese Patent Application No. 2015-036969, filed on Feb. 26, 2015, the entire contents of which are hereby incorporated by reference.

BACKGROUND

Technical Field

The present specification relates to an idling stop control device which can save fuel and reduce an amount of an exhaust gas by automatically temporarily stopping an operation of an internal combustion engine.

Description of the Related Art

Conventionally, there is known a vehicle equipped with an idling stop control device that executes an idling stop control. In general, the idling stop control device automatically stops an operation of an internal combustion engine when the idling stop control device detects a stop of a vehicle on the basis of a speed of the vehicle (i.e., a vehicle speed) or an operation of a brake pedal or the like. On the other hand, the idling stop control device restarts the operation of the engine when the idling stop control device detects a start of a movement of the vehicle on the basis of a release of the brake pedal or the like. In addition, there is known an idling stop control that automatically stops the operation of the engine while the vehicle stops as well as while the vehicle travels. For example, according to this idling stop control, when the brake pedal is depressed or operated and thus, the vehicle decelerates, the operation of the engine is automatically stopped.

When the operation of the engine has been automatically stopped by an execution of the idling stop control, a generation of an electric power by an alternator stops and thus, an electric power is supplied only from a battery to an in-vehicle electric loads. When a condition for permitting the execution of the idling stop control is not satisfied, for example, due to a release of the brake pedal, a starter is supplied with an electric power from the battery to restart the operation of the engine.

For example, in a device proposed in JP 2010-91496 A, in order to assuredly restart the operation of the engine, as the condition for permitting the execution of the idling stop control is set a condition that an amount of an electric power remaining in the battery is equal to or larger than a reference amount.

One of the known in-vehicle electric loads is an electric actuator that changes a motion state of the vehicle during the travelling of the vehicle. When the operation of the engine has been automatically stopped by the execution of the idling stop control during the travelling of the vehicle, the electric actuator is supplied with an electric power from the battery. For example, one of such electric actuators is an electric active stabilizer. The electric active stabilizer drives an electric motor to change a torsional stiffness of a stabilizer bar such that a target roll angle can be achieved. The electric active stabilizer temporarily operates, for example, when the vehicle turns, however, an amount of an electric power consumed by the activation of the electric active stabilizer is large.

Thus, when the electric active stabilizer starts to activate while the operation of the engine has been stopped by the execution of the idling stop control, the amount of the electric power remaining in the battery may decrease to below the reference amount during the activation of the electric active stabilizer. An idling stop control device proposed in JP 2010-91496 A activates a starter to restart the operation of the engine when the device detects that the amount of the electric power remaining in the battery decreases to below the reference amount. At this time, the activation of the starter causes an amount of an electric power supplied to the electric active stabilizer to change and thus, causes the rolling motion state of the vehicle to undesirably change. Therefore, the vehicle driver may be subject to a discomfort.

Such a problem raises in the electric active stabilizer as well as in the other electric actuators that change the motion state of the vehicle. In other words, an amount of an electric power consumed by the activation of the electric actuator that changes the motion state of the vehicle is generally large and thus, the starter may activate at a relatively high frequency under the condition described above during the execution of the idling stop control. As a result, the motion state of the vehicle considerably changes and thus, the vehicle driver may be subject to a discomfort

SUMMARY

The present specification solves the above-mentioned problem. In particular, one of objects of the present specification is to prohibit the automatic restart of the operation of the engine by the idling stop control during the activation of the electric actuator as possible, thereby to prohibit an occurrence of a discomfort in the vehicle driver.

In order to achieve the above-mentioned object of the present specification , an idling stop control device according to the present specification is applied to a vehicle comprising:

an internal combustion engine;

an in-vehicle electric power source including an electric power generator that generates an electric power by a rotation of the engine and a battery configured to be charged with an electric power by the electric power generator;

a starter that starts an operation of the engine with an electric power supplied from the battery; and an electric actuator that changes a motion state of the vehicle during a travelling of the vehicle with an electric power supplied from the in-vehicle electric power source.

The idling stop control device according to the present specification comprises an electronic control unit programmed to execute an idling stop control when a predetermined condition is satisfied during the travelling of the vehicle.

The idling stop control includes an automatic engine stop control that automatically stops the operation of the engine and an automatic engine restart control that restarts the operation of the engine.

The electronic control unit is programmed:

to acquire a remaining electric power amount index value which represents a magnitude of an amount of an electric power remaining in the battery;

to detect an activation state of the electric actuator;

to execute the automatic engine stop control to stop the operation of the engine when an automatic engine stop condition which includes a condition that the remaining electric power amount index value is equal to or larger than an engine stop permission threshold, is satisfied;

to execute the automatic engine restart control to restart the operation of the engine when an automatic engine restart condition which includes a condition that at least the remaining electric power amount index value is smaller than an engine restart threshold after the operation of the engine is automatically stopped, is satisfied; and to change the engine stop permission threshold from a first threshold, which is set immediately before the start of the activation of the electric actuator, to a second threshold, which is larger than the first threshold, when the electronic control unit does not execute the automatic engine stop control and detects the activation of the electric actuator.

The idling stop control device according to the present specification is applied to the vehicle comprising the engine, the in-vehicle electric source, the starter and the electric actuator. Further, the idling stop control device according to the present specification comprises the electronic control unit (i.e., the ECU) that executes the idling stop control when a predetermined condition is satisfied during the travelling of the vehicle. The idling stop control includes the automatic engine stop control that automatically stops the operation of the engine and the automatic engine restart control that restarts the operation of the engine. The in-vehicle electric power source has the electric power generator that generates an electric power by the rotation of the engine and the battery which is charged with an electric power by the electric power generator. The starter serves to start the operation of the engine, using an electric power supplied from the battery. The electric actuator is supplied with an electric power from the in-vehicle electric power source to change the motion state of the vehicle during the travelling of the vehicle.

The electronic control unit is programmed to acquire the remaining electric power amount index value which represents the magnitude of the amount of the electric power remaining in the battery. As the remaining electric power amount index value, for example, an SOC (State Of Charge) value which represents a ratio of the amount of the electric power remaining in the battery to the full amount of the electric power of the battery can be used.

Further, the electronic control unit is programmed to detect the activation state of the electric actuator. Furthermore, the electronic control unit is programmed to execute the automatic engine stop control to stop the operation of the engine when the automatic engine stop condition which includes the condition that the remaining electric power amount index value is equal to or larger than an engine stop permission threshold, is satisfied. On the other hand, the electronic control unit is programmed to execute the automatic engine restart control to restart the operation of the engine when the automatic engine restart condition which includes the condition that at least the remaining electric power amount index value is smaller than the engine restart threshold after the operation of the engine is automatically stopped, is satisfied.

When the electric actuator starts to activate while the operation of the engine is stopped by the execution of the automatic engine stop control, the remaining electric power amount index value of the battery is likely to decrease to below the engine restart threshold during the activation of the electric actuator. When the remaining electric power amount index value of the battery decreases to below the engine restart threshold, the starter activates. At this time, the amount of the electric power supplied to the electric actuator may change. Thereby, the motion state of the vehicle may undesirably change and thus, the vehicle driver may be subject to a discomfort Accordingly, the electronic control unit according to the present specification is programmed to change the engine stop permission threshold from the first threshold, which is set immediately before the start of the activation of the electric actuator, to the second threshold, which is larger than the first threshold, when the electronic control unit does not execute the automatic engine stop control and detects the activation of the electric actuator.

Therefore, when the electric actuator activates, the automatic engine stop condition is unlikely to be satisfied. Thereby, when the operation of the engine is automatically stopped during the activation of the electric actuator, the remaining electric power amount index value of the battery is assuredly maintained at a value equal to or larger than the second threshold.

Therefore, even when the operation of the engine is automatically stopped during the activation of the electric actuator, it is possible to reduce a possibility that the remaining electric power amount index value of the battery decreases to below the engine restart threshold during the activation of the electric actuator. In other words, it is possible to reduce a possibility that the operation of the engine is automatically restarted by the automatic engine restart control of the idling stop control. As a result, the motion state of the vehicle can be stably controlled and thus, the vehicle driver is unlikely to be subject to a discomfort as possible.

According to an aspect of the present specification, the electronic control unit may be programmed to return the engine stop permission threshold from the second threshold to the first threshold when the electronic control unit detects a termination of the activation of the electric actuator after the electronic control unit changes the engine stop permission threshold from the first threshold to the second threshold.

According to this aspect of the present specification, when the termination of the activation of the electric actuator is detected after the engine stop permission threshold is changed from the first threshold to the second threshold, the engine stop permission threshold is returned from the second threshold to the first threshold. Thereby, when the vehicle driver is unlikely to be subject to a discomfort due to a change of the motion state of the vehicle, advantageous effects such as a reduction of an amount of fuel consumed by the engine and a reduction of an amount of an exhaust gas discharged from the engine can be assuredly obtained by the execution of the idling stop control.

According to another aspect of the present specification, the electric actuator may be an electric active stabilizer that changes a torsional stiffness of a stabilizer bar by driving an electric motor.

According to this aspect of the present specification, when the electric active stabilizer starts to activate while the automatic engine stop control is not executed, the engine stop permission threshold is changed from the first threshold to the second threshold. Thereby, when the operation of the engine is automatically stopped during the activation of the electric active stabilizer, the remaining electric power amount index value of the battery is assuredly maintained at a value equal to or larger than the second threshold. As a result, it is possible to reduce a possibility that a rolling motion state of the vehicle undesirably changes and it is possible to prohibit the vehicle driver from being subject to a discomfort as possible. In particular, the electric active stabilizer operates during a turning of a body of the vehicle and thus, normally, the activation time of the electric active stabilizer is short. Therefore, it is possible to set the second threshold such that the remaining electric amount index value of the battery does not decrease to below the engine restart threshold during the activation of the electric active stabilizer.

Further, the electric active stabilizer may activate due to a disturbance occurring when vehicle travels on an uneven road. At this time, the electric active stabilizer activates independently of the vehicle drivers operation. When the execution of the automatic engine restart control of the idling stop control starts independently of the vehicle divers operation, the vehicle driver is likely to be subject to a discomfort, compared with when the execution of the automatic engine restart control starts is terminated by the vehicle drivers operation. Thus, when the operation of the engine restarts during the activation of the electric active stabilizer, the vehicle driver is likely to be subject to a discomfort. On the other hand, according to the another aspect of the present specification, it is possible to appropriately solve such a problem.

According to another aspect of the present specification, the electronic control unit is programmed to set the second threshold such that the second threshold set when a speed of the vehicle is large, is larger than the second threshold set when the speed of the vehicle is small.

When the vehicle travels at a high speed, a time of activation of the electric active stabilizer tends to increase or an amount of the electric power consumed by activation of the electric active stabilizer tends to increase. According to the another aspect of the present specification, the second threshold is set such that the second threshold set when the speed of the vehicle is large, is larger than the second threshold set when the speed of the vehicle is small. Thus, it is possible to further reduce a possibility that the starter activates during the activation of the electric active stabilizer.

In the above description, for facilitating understanding of the present specification, elements of the present specification corresponding to elements of an embodiment described later are denoted by reference symbols used in the description of the embodiment accompanied with parentheses. However, the elements of the present specification are not limited to the elements of the embodiment defined by the reference symbols. The other objects, features and accompanied advantages of the present specification can be easily understood from the description of the embodiment of the present specification along with the drawings.

DESCRIPTION OF THE PREFERRED EMBODIMENTS

Figure 1:
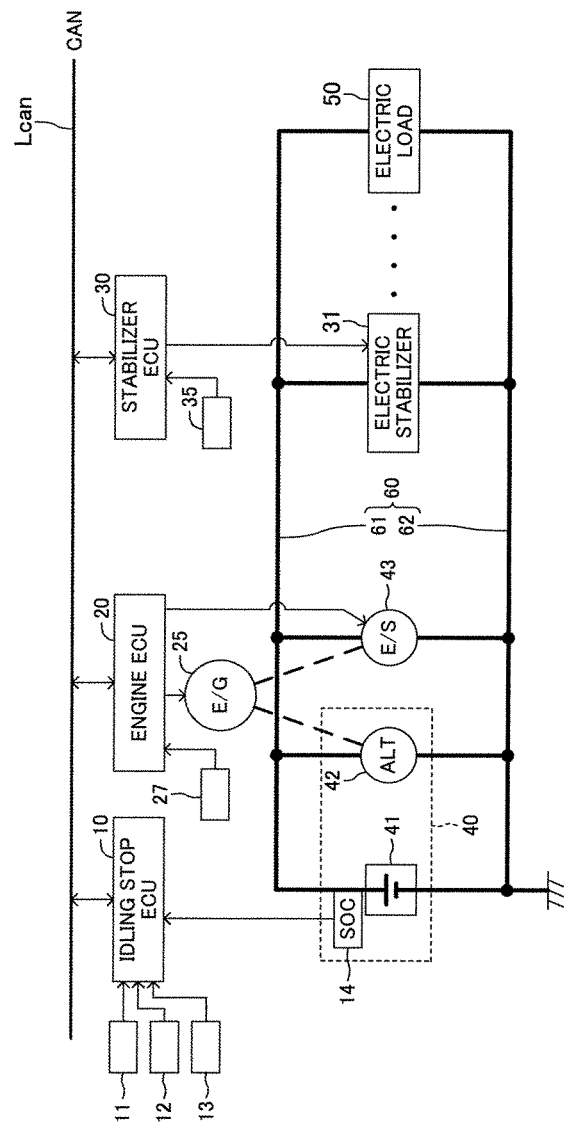
FIG. 1 shows a schematic configuration view of a system relating to an idling stop control according to one embodiment.

Below, an idling stop control device according to an embodiment of the present specification will be described with reference to the drawings. FIG. 1 shows a schematic configuration of an idling stop control device and a system relating to an operation of the idling stop control device. A vehicle (or an automobile) of the embodiment is a vehicle, which is configured to travel with wheels driven by an internal combustion engine. This vehicle does not include any electric drive source such as an electric motor that drives the vehicle.

This vehicle includes the idling stop control device having an idling stop electronic control unit 10. The idling stop electronic control unit 10 according to the embodiment executes an idling stop control that automatically stops an operation of an internal combustion engine 25 when an idling stop condition is satisfied during the stop of the vehicle as well as during the travelling of the vehicle. Hereinafter, the idling stop electronic control unit 10 will be referred to as "the idling stop ECU 10".

The idling stop ECU 10 is connected in communication with an engine electronic control unit 20 and an active stabilizer electronic control unit 30 via a communication line Lcan provided in a CAN (Controller Area Network). The idling stop ECU 10 can send and receive information to and from the engine electronic control unit 20 and the active stabilizer electronic control unit 30. Hereinafter, the engine electronic control unit 20 will be referred to as "the engine ECU 20" and the active stabilizer electronic control unit 30 will be referred to as "the stabilizer ECU 30".

The engine ECU 20 is an electronic control unit provided with a microcomputer as a main part that controls an output of the engine 25 (i.e., an engine torque and an engine speed). The engine ECU 20 receives a detection signal output from various engine-control-related sensors 27 and executes various controls such as a fuel injection control, a fuel ignition control and an intake air amount control. Further, the engine ECU 20 receives an engine stop command and an engine restart command which are idling stop control commands, respectively sent from the idling stop ECU 10. The engine ECU 20 is configured or programmed to automatically stop an operation of the engine 25 in accordance with the engine stop command and automatically restart the operation of the engine 25 in accordance with the engine restart command.

An alternator 42 is operatively connected to a crank shaft of the engine 25. The alternator 42 generates an electric power by a rotation of the crank shaft The alternator 42 corresponds to an electric generator of the present specification. The alternator 42 includes a rectifier (not shown) that converts a generated alternate current to a direct current. The alternator 42 outputs a direct current electric power rectified by the rectifier. The generated electric power output from the alternator 42 is used to charge an in-vehicle battery 41 with the electric power and activating in-vehicle electric loads 50.

The vehicle has an in-vehicle electric source 40 comprised of the battery 41 and the alternator 42 which are electrically connected in parallel. In this embodiment, the battery 41 is a common lead-add storage battery which provides a 14V direct current electric source. However, the battery 41 may be the other type of a battery.

Positive terminals of the battery 41 and the alternator 42 are both electrically connected to a positive-side line 61. Ground terminals of the battery 41 and the alternator 42 are both electrically connected to a ground-side line 62. The positive-side and ground-side lines 61 and 62 are provided in the vehicle as a pair and forms an electric power supply line 60 to the electric loads 50 provided in the vehicle. Although not shown in FIG. 1, an electric power that operates various electric control units (ECU) including the ECUs 10, 20 and 30 is supplied via the electric power supply line 60 with the various electric control units. A booster circuit (not shown) that backs up the electric source is provided in the electric power supply line 60 which is connected to the ECUs. This booster circuit can supply the ECUs with an electric power having a stable voltage even when an electric source voltage supplied from the in-vehicle electric source 40 temporarily drops.

An engine starter 43 is electrically connected to the electric power supply line 60. The starter 43 is a motor that starts an operation of the engine 25 by the electric power supplied from the battery 41. The starter 43 is electrically connected to the engine ECU 20. When the engine ECU 20 detects an operation of an engine start switch (not shown) carried out by a vehicle driver during the stop of the vehicle, the engine ECU 20 activates the starter 43 to start the operation of the engine 25. In addition, the starter 43 is used to restart the operation of the engine 25 during an idling stop described later.

An electric active stabilizer 31 is provided in the vehicle. The drive of the stabilizer 31 is controlled by the stabilizer ECU 30. The stabilizer ECU 30 and the stabilizer 31 together forms an electric active stabilizer device. The electric active stabilizer device is a known device (for example, see JP 2005-335504 A).

Figure 2:
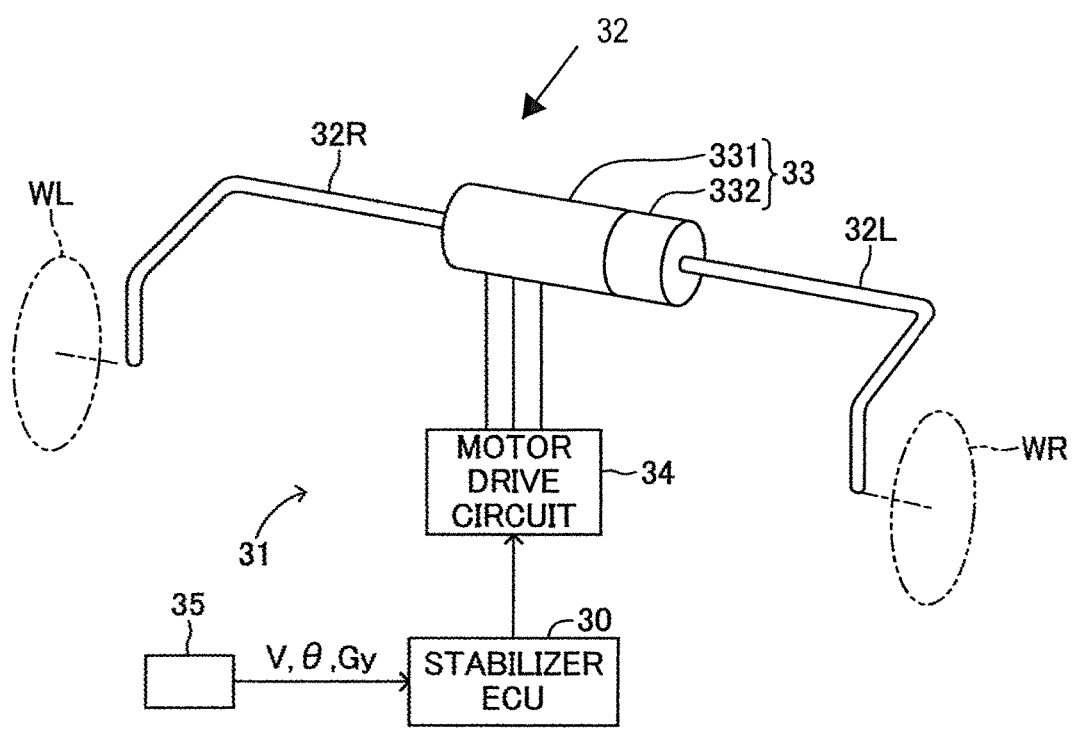
FIG. 2 shows a schematic configuration view of an electric active stabilizer device.

As shown in FIG. 2, the stabilizer 31 is provided between either of the front wheels and the rear wheels. The stabilizer 31 serves to reduce a rolling motion of a body of the vehicle. The stabilizer 31 includes a left stabilizer bar 32L, a right stabilizer bar 32R, a motor unit 33 and a motor drive circuit 34. The left stabilizer bar 32L is mechanically connected to an unsprung left wheel WL at one end of the left stabilizer bar 32L. The right stabilizer bar 32R is mechanically connected to an unsprung right wheel WR at one end of the right stabilizer bar 32R. The motor unit 33 is comprised of an electric motor 331 and a reduction mechanism 332 which are interposed between the other end of the left stabilizer bar 32L and the other end of the right stabilizer bar 32R. The motor drive circuit 34 drives the motor 331. The stabilizer 31 corresponds to an electric actuator of the present invention.

In the stabilizer 31, the motor 331 can rotate the left stabilizer bar 32L and the right stabilizer bar 32R, relatively about an axis via the reduction mechanism 332, thereby to change a torsional stiffness of a stabilizer bar 32 comprised of the left and right stabilizer bars 32L and 32R.

The stabilizer ECU 30 includes a microcomputer as a main part. The stabilizer ECU 30 drives the motor 331 of the stabilizer 31 to control the torsional stiffness of the stabilizer bar 32. The stabilizer ECU 30 is electrically connected to a rolling-motion-control-related sensor 35 necessary that controls a rolling motion of the vehicle. The rolling-motion-control-related sensor 35 includes a vehicle speed sensor that detects a speed V of the vehicle, a steering angle sensor that detects a steering angle θ of a steering wheel and a lateral acceleration sensor that detects a lateral acceleration Gy of the body of the vehicle. The stabilizer ECU 30 calculates a target roll angle on the basis of detection values such as the vehicle speed V, the steering angle θ and the lateral acceleration Gy detected by the rolling-motion-control-related sensor 35. Further, the stabilizer ECU 30 calculates a motor torque of the motor 331 capable of achieving the target roll angle and sets a target electric current value depending on the calculated target motor torque.

The stabilizer ECU 30 controls switching elements provided in the motor drive circuit 34 such as an inverter circuit or an H bridge circuit to cause an electric current corresponding to the target electric current to flow through the motor 331. The motor drive circuit 34 is electrically connected to the electric power supply line 60 and causes the electric current corresponding to the target electric current to flow through the motor 331 from the in-vehicle electric source 40. Thereby, the roll angle of the body of the vehicle can be controlled to the target roll angle.

Such a rolling motion control is executed only when the lateral acceleration or a yaw rate is generated in the body of the vehicle, that is, only when the vehicle travels.

Next, an idling stop control shown in FIG. 1 and executed by the idling stop ECU 10 will be described. The idling stop ECU 10 includes a microcomputer as a main part. The idling stop ECU 10 is electrically connected to a vehicle speed sensor 11, a brake pedal sensor 12, an acceleration pedal sensor 13 and an SOC sensor 14. The vehicle speed sensor 11 outputs a detection signal expressing the vehicle speed V.

The brake pedal sensor 12 outputs a detection signal that allows the determination of whether or not a brake pedal is operated. For example, as the brake pedal sensor 12 is used brake switch, an operation state of which changes between an on-state and an off-state depending on whether or not the brake pedal is depressed or operated or a brake position sensor that detects a depression stroke of the brake pedal or a brake pressure sensor that detects a brake fluid pressure of a master cylinder. The acceleration pedal sensor 13 outputs a detection signal that allows the determination of whether or not an acceleration pedal is depressed or operated. For example, as the acceleration pedal sensor 13 is used a sensor such as an acceleration pedal position sensor that detects a depression stroke of the acceleration pedal. It should be noted that the acceleration pedal sensor 13 is used in a modified example described later.

The SOC sensor 14 outputs a battery charge value (i.e., an SOC value) SOCx (%) which is an index value, which expresses a present state of the battery 41 (i.e., a state of charge), that is, expresses a magnitude of an amount of an electric power remaining in the battery 41. The battery charge value SOCx can be expressed by a rate (%) of the amount of the electric power remaining in the battery 41 with respect to a full amount of the electric power of the battery 41. For example, the SOC sensor 14 detects a charged/discharged electric current (i.e., a charged electric current and a discharged electric current) which flows through the battery 41. A value of the charged electric current, which flows in a direction of charging the battery 41 with an electric power, is positive. A value of the discharged electric current, which flows in a direction of discharging an electric power from the battery 41, is negative. The present battery charge value SOCx can be acquired by integrating the values of the charged and discharged electric currents. In this case, the SOC sensor 14 may be simply an electric current sensor that outputs a detection value of the charged and discharged electric currents, which flow through the battery 41, to the idling stop ECU 10 every predetermined cyclic period. Further, in this case, the idling stop ECU 10 may be configured to integrate the values of the charged and discharged electric currents to acquire the battery charge value SOCx.

It should be noted that the battery charge value SOCx is not limited to a value acquired on the basis of the values of the charged and discharged electric currents of the battery 41. The battery charge value SOCx may be a value acquired on the basis of a value of a terminal voltage of the battery 41, a value of an interior resistance of the battery 41 and the like. In this case, an accurate battery charge value SOCx can be acquired by correcting the battery charge value SOCx on the basis of a temperature of the battery 41. Further, a minimum value out of the battery charge values SOCx or an average value of the battery charge values SOCx each acquired by calculation methods may be acquired as a conclusive battery charge value SOCx.

Figure 3:
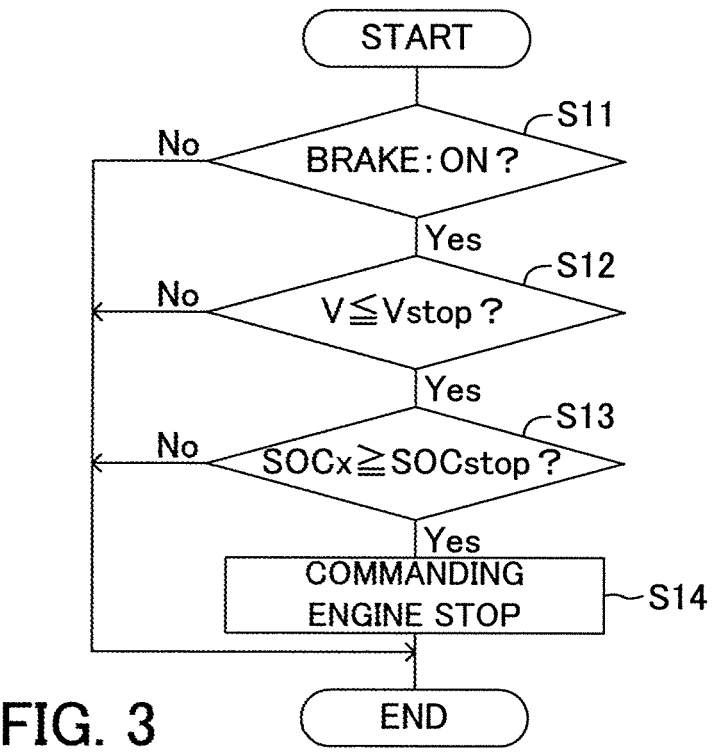
FIG. 3 shows a flowchart of an idling stop start control routine.

Next, a condition for starting the execution of the idling stop control (i.e., an idling stop control start condition) will be described. FIG. 3 shows an idling stop control start control routine executed by the idling stop ECU 10. The idling stop control start control routine is executed repeatedly at a predetermined short calculation cycle when the idling stop control is not executed.

When the execution of the idling stop control start control routine starts, the idling stop ECU 10 reads a detection signal detected by the brake pedal sensor 12 at a step S11 and determines whether or not the brake pedal is depressed on the basis of the detection signal. When the brake pedal is not depressed, the idling stop ECU 10 determines "No" at the step S11 and then, terminates this routine once. The idling stop ECU 10 executes the routine shown in FIG. 3 at the predetermined calculation cycle. When the depression operation of the brake pedal is detected during the repeated execution of the process of the step S11, the idling stop ECU 10 determines "Yes" at the step S11 and then, proceeds with the process to a step S12 to read a vehicle speed V detected by the vehicle speed sensor 11 and determine whether or not the vehicle speed V is equal to or smaller than a predetermined set vehicle speed Vstop. The set vehicle speed Vstop defines a condition for permitting the start of the execution of the idling stop control (in particular, an automatic engine stop control). In this embodiment, the set vehicle speed Vstop is set to a vehicle speed larger than a vehicle stop speed (i.e., 0 km/h) capable of starting the execution of the idling stop control during a deceleration of the vehicle. For example, the set vehicle speed Vstop is set to 10 km/h. It should be noted that the condition for permitting the start of the execution of the idling stop control will be referred to as "the idling stop start permission condition".

When the vehicle speed V exceeds the set vehicle speed Vstop, the idling stop ECU 10 terminates this routine once. The idling stop ECU 10 executes the process of the step S12 repeatedly. When the idling stop ECU 10 detects that the brake pedal is operated and the vehicle speed V is equal to or smaller than the set vehicle speed Vstop, the idling stop ECU 10 determines "Yes" at the steps S11 and S12 and then, proceeds with the process to a step S13 to read a battery charge value SOCx detected by the SOC sensor 14 and determine whether or not the present battery charge value SOCx is equal to or larger than a predetermined engine stop permission threshold SOCstop. This engine stop permission threshold SOCstop defines a condition for permitting the start of the execution of the idling stop control.

When the battery charge value SOCx is smaller than the engine stop permission threshold SOCstop, the idling stop ECU 10 terminates this routine once. The idling stop ECU 10 executes the process of the step S13 repeatedly. When the conditions of the steps S11, S12 and S13 are all satisfied, the idling stop ECU 10 proceeds with the process to a step S14 to output an engine stop command to the engine ECU 20. In other words, when three conditions, that is, (1) the brake pedal is operated, (2) the vehicle speed V is equal to or smaller than the set vehicle speed Vstop and (3) the battery charge value SOCx is equal to or larger than the engine stop permission threshold SOCstop are all satisfied, the idling stop ECU 10 determines that the idling stop control start condition is satisfied and outputs the engine stop command to the engine ECU 20. When the engine ECU 20 receives the engine stop command, the engine ECU 20 stops the fuel injection and the fuel ignition to stop the engine 25.

In this manner, the idling stop ECU 10 starts to execute the idling stop control when the vehicle speed V decreases to below the set vehicle speed Vstop during the travelling of the vehicle.

Figure 4:
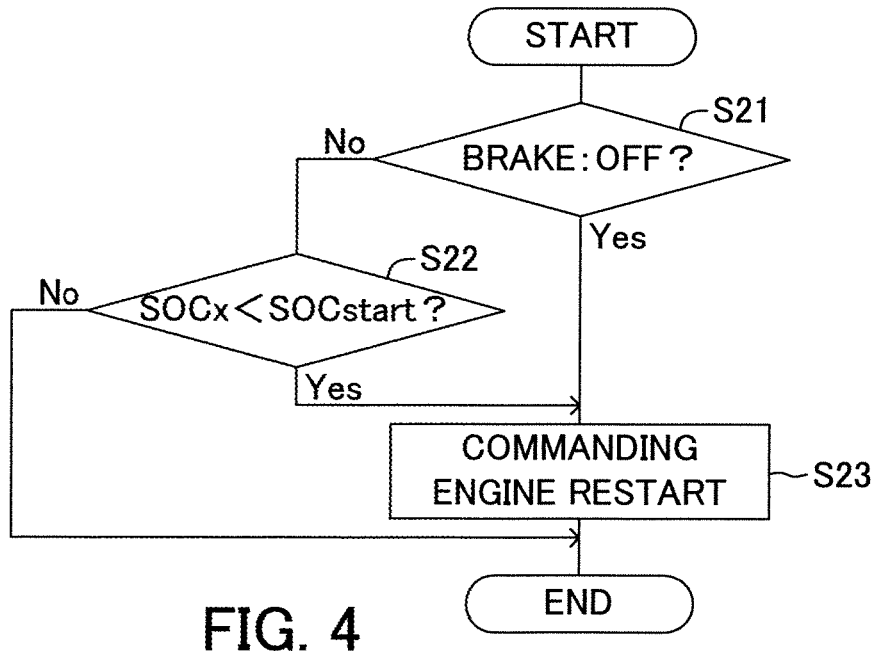
FIG. 4 shows a flowchart of an idling stop termination control routine.

When the operation of the engine 25 is automatically stopped, that is, when the execution of the idling stop control is started, the idling stop ECU 10 starts to execute an idling stop control termination control routine shown in FIG. 4 instead of the idling stop control start control routine. The idling stop ECU 10 executes repeatedly the idling stop control termination control routine at a predetermined short calculation cycle.

When the execution of the idling stop control termination control routine starts, the idling stop ECU 10 reads a detection signal detected by the brake pedal sensor 12 at a step S21 and determines whether or not the brake pedal is released on the basis of the detection signal. When the brake pedal is not released, the idling stop ECU 10 determines "No" at the step S21 and then, proceeds with the process to a step S22 to read a battery charge value SOCx detected by the SOC sensor 14 and determine whether or not the present battery charge value SOCx is smaller than a predetermined engine restart threshold SOCstart. The engine restart threshold SOCstart defines a condition for prohibiting the execution of the idling stop control and is set to a value smaller than the engine stop permission threshold SOCstop.

The idling stop ECU 10 executes repeatedly the determinations of the steps S21 and S22. When any one of the conditions of the steps S21 and S22 is satisfied, the idling stop ECU 10 proceeds with the process to a step S23 to output an engine restart command to the engine ECU 20. In particular, when any one of two conditions is satisfied, that is, when (1) the brake pedal is released or (2) the battery charge value SOCx becomes smaller than the engine restart threshold SOCstart, the idling stop ECU 10 determines that a condition for terminating the idling stop control is satisfied, that is, the idling stop ECU 10 determines "Yes" at the step S21 or S22 and then, proceeds with the process to the step S23 to output the engine restart command to the engine ECU 20. When the engine ECU 20 receives the engine restart command, the engine ECU 20 activates the starter 43 to start the operation of the engine 25. Thus, the execution of the idling stop control is terminated. It should be noted that the condition (1) may be replaced with a condition that the brake pedal is released and the acceleration pedal is depressed.

When the operation of the engine 25 is stopped by the execution of the idling stop control, the alternator 42 generates no electric power. Thus, only the battery 41 can be used as the in-vehicle electric source 40. Therefore, when the stabilizer 31 activates while the operation of the engine 25 has been stopped by the execution of the idling stop control, an electric power is supplied from the battery 41 to the stabilizer 31. In this case, an amount of an electric power consumed by the stabilizer 31 is relatively large and thus, the battery charge value SOCx decreases faster than usual.

In this case, when the battery charge value SOCx decreases to below the engine restart threshold SOCstart, which defines an idling stop control prohibition condition, during the execution of the idling stop control termination control routine, the starter 43 is activated to restart the operation of the engine 25. When the starter 43 starts to activate during the activation of the stabilizer 31, an electric power is not stably supplied to the stabilizer 31 and thus, the rolling motion state of the body of the vehicle may change undesirably.

Figure 5:
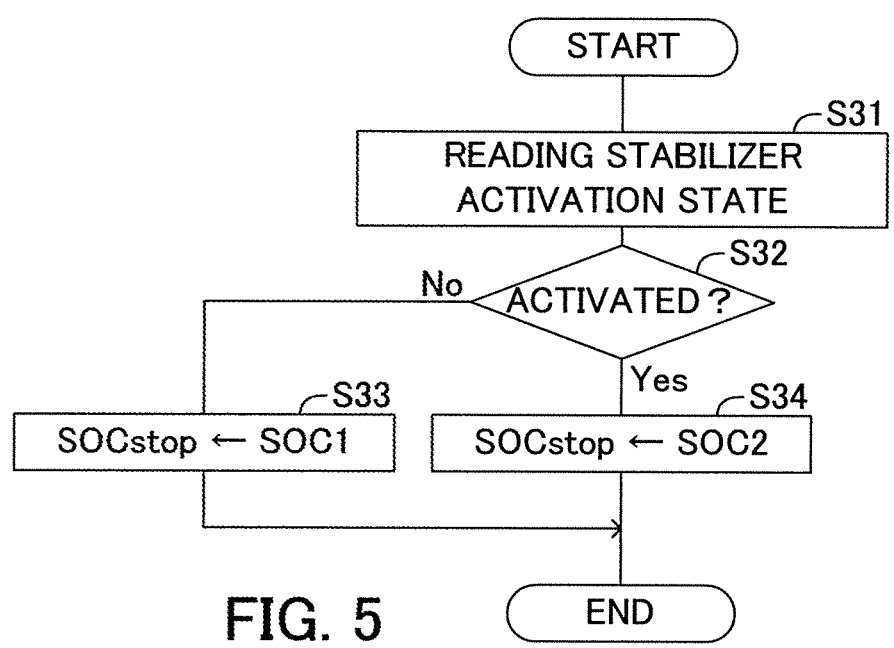
FIG. 5 shows a flowchart of an SOC threshold change control routine.

Accordingly, the idling stop ECU 10 is configured or programmed to execute a process that prohibits the restart of the operation of the engine 25 carried out by the execution of the idling stop control during the activation of the stabilizer 31 as possible. FIG. 5 shows an SOC threshold change control routine executed by the idling stop ECU 10. The SOC threshold change control routine is repeatedly executed at a predetermined short calculation cycle while an ignition switch of the vehicle is ON.

When the execution of the SOC threshold change control routine starts, the idling stop ECU 10 reads information on an activation state of the stabilizer 31 from the stabilizer ECU 30 at a step S31. The stabilizer ECU 30 sends a signal indicating that the stabilizer 31 is activated to the communication line Lcan when the stabilizer ECU 30 activates the stabilizer 31. On the other hand, the stabilizer ECU 30 sends a signal indicating that the stabilizer 31 is not activated to the communication line Lcan when the stabilizer ECU 30 does not activate the stabilizer 31. The idling stop ECU 10 reads this signal sent to the communication line Lcan.

Then, the idling stop ECU 10 proceeds with the process to a step S32 to determine whether or not the stabilizer 31 is activated. When the stabilizer 31 is not activated, the idling stop ECU 10 determines "No" at the step 832 and then, proceeds with the process to a step S33 to set the engine stop permission threshold SOCstop, which defines the idling stop start permission condition, to a first threshold SOC1. On the other hand, when the stabilizer 31 is activated, the idling stop ECU 10 determines "Yes" at the step S32 and then, proceeds with the step to a step S34 to set the engine stop permission threshold SOCstop to a second threshold SOC2. The second threshold SOC2 is larger than the first threshold SOC1.

After the idling stop ECU 10 sets the engine stop permission threshold SOCstop at the step S33 or S34, the idling stop ECU 10 terminates this routine once. The idling stop ECU 10 repeatedly executes this routine at the predetermined calculation cycle.

Figure 6:
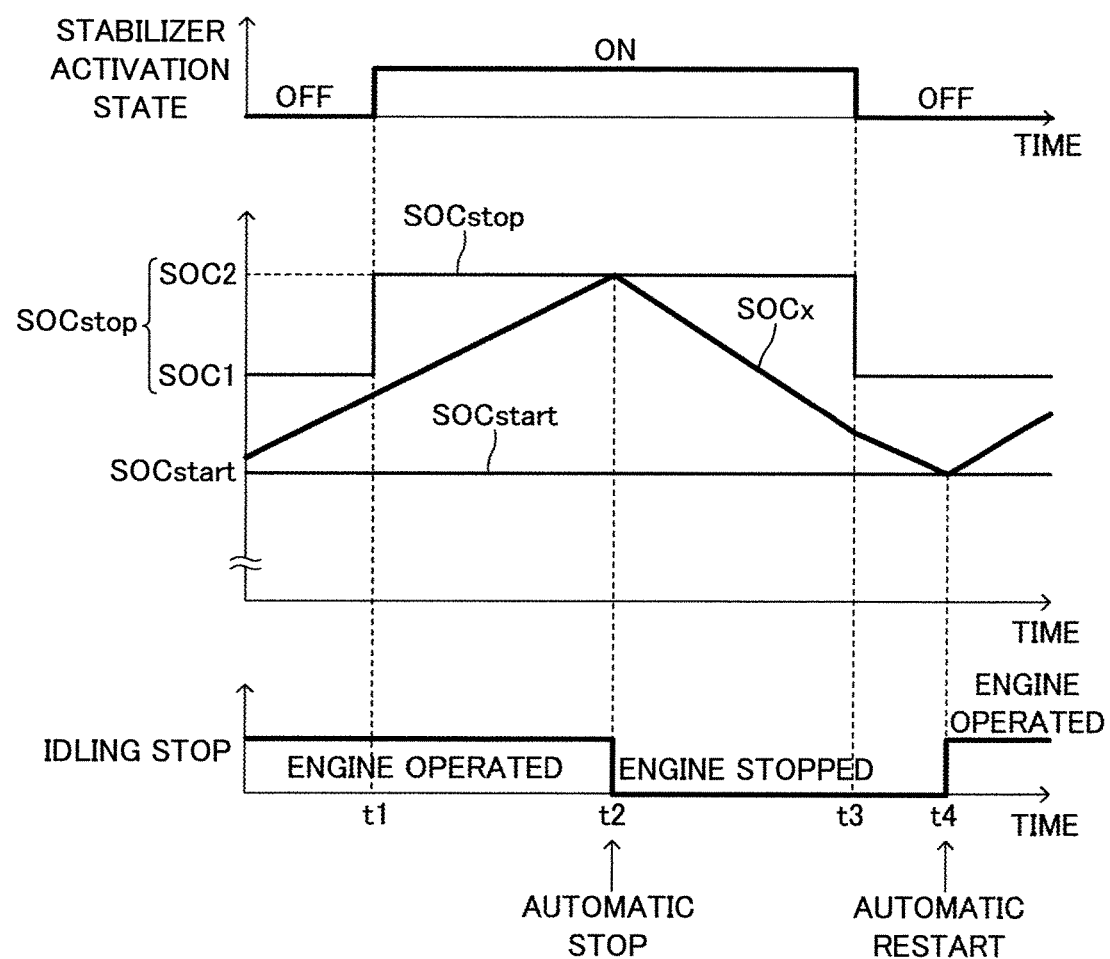
FIG. 6 shows a time chart used for describing an activation of the electric stabilizer and a change timing of an SOC threshold.

FIG. 6 shows a time chart illustrating a timing of changing the engine stop permission threshold SOCstop. When the idling stop control is not executed and thus, the engine 25 operates, the alternator 42 generates an electric power. Therefore, when the charge state of the battery 41 does not correspond to the full charge state, in particular, in case of controlling the charge value of the battery 41 to a target charge value, when the charge value of the battery 41 does not reach the target charge value, the battery 41 is charged by the alternator 42 and thus, the battery charge value SOCx increases.

When the stabilizer 31 is not activated, the engine stop permission threshold SOCstop has been set to the first threshold SOC1. When the activation of the stabilizer 31 starts at a time t1, the engine stop permission threshold SOCstop is changed from the first threshold SOC1 to the second threshold SOC2. For the sake of facilitating the understanding of the description, it is assumed that the conditions (1) and (2) among the idling stop start permission conditions (1) to (3) are satisfied. In this example, at the time t1, the battery charge value SOCx does not reach the first threshold SOC1. Thus, when the activation of the stabilizer 31 starts, the execution of the idling stop control does not start When the engine stop permission threshold SOCstop is changed to the second threshold SOC2, compared with when the engine stop permission threshold SOCstop is not changed to the second threshold SOC2, the idling stop start permission condition is unlikely to be satisfied and thus, the start of the execution of the idling stop control delays. In other word, at least before the battery charge value SOCx reaches the second threshold SOC2, the start of the execution of the idling stop control is not permitted. Therefore, before the battery charge value SOCx reaches the second threshold SOC2, the battery 41 is charged and thus, this charge of the battery 41 can maintain an ability of supplying an electric power necessary to operate the stabilizer 31. When the execution of the idling stop control starts during the activation of the stabilizer 31, the battery charge value SOCx reaches the second threshold SOC2.

When the battery charge value SOCx reaches the second threshold SOC2 at a time t2, the three idling stop control start permission conditions are all satisfied. Thus, the execution of the idling stop control starts. In other words, the operation of the engine 25 is automatically stopped by the execution of the idling stop control. Thereby, an electric power is supplied from the battery 41 to the stabilizer 31 and thus, the battery charge value SOCx decreases. When the battery charge value SOCx decreases to the engine restart threshold SOCstart, the execution of the idling stop control is terminated, that is, the operation of the engine 25 is automatically restarted.

Therefore, an amount of an electric power capable of being supplied from the battery 41 during the execution of the idling stop control can be increased by changing the engine stop permission threshold SOCstop to the second threshold SOC2 before the execution of the idling stop control starts. For example, an amount of an electric power capable of being supplied from the battery 41 during the execution of the idling stop control increases as a value dSOC obtained by subtracting the engine restart threshold SOCstart from the engine stop permission threshold SOCstop (dSOC=SOCstop−SOCstart) increases. Thus, an amount of an electric power capable of being supplied from the battery 41 during the execution of the idling stop control can be increased to an amount depending on the value dSOC (=SOC2−SOC1) by changing the engine stop permission threshold SOCstop to the second threshold SOC2 larger than the first threshold SOC1 when the activation of the stabilizer 31 starts.

On the other hand, when the turning motion of the body of the vehicle ends, the activation of the stabilizer 31 is terminated and thus, normally, the activation of the stabilizer 31 is continued only for a short time. Thus, the second threshold SOC2 can be appropriately set. In other word, the second threshold SOC2 can be set to a value capable of prohibiting the battery charge value SOCx from decreasing to below the engine restart threshold SOCstart. Therefore, even at a time t3 upon the termination of the activation of the stabilizer 31, the stop of the operation of the engine 25 can be maintained.

When the battery charge value SOCx further decreases to reach the engine restart threshold SOCstart at a time t4 after the termination of the activation of the stabilizer 31, the idling stop control termination condition is satisfied. Thereby, the operation of the engine 25 is restarted.

Therefore, according to the embodiment, it is possible to reduce a possibility that the battery charge value SOCx decreases to below the engine restart threshold SOCstart, that is, a possibility that the starter 43 activates due to the execution of the idling stop control during the activation of the stabilizer 31. Thereby, it is possible to reduce a possibility that the rolling motion state undesirably changes while the stabilizer ECU 30 executes the rolling motion control. Therefore, the vehicle driver of the vehicle is unlikely to be subject to a discomfort The stabilizer 31 may activate due to a disturbance occurring, for example, when the vehicle travels on an uneven road. In this case, the stabilizer 31 activates, independently of a vehicle driver's operation. When the automatic restart of the operation of the engine 25 starts independently of the vehicle driver's operation, the vehicle driver is likely to be subject to a discomfort, compared with when the automatic restart of the operation of the engine 25 starts due to the vehicle driver's operation. Thus, the termination of the execution of the idling stop control during the activation of the stabilizer 31 is likely to lead to a discomfort in the vehicle driver. In this regard, the embodiment can appropriately solve such a problem.

Figure 9:
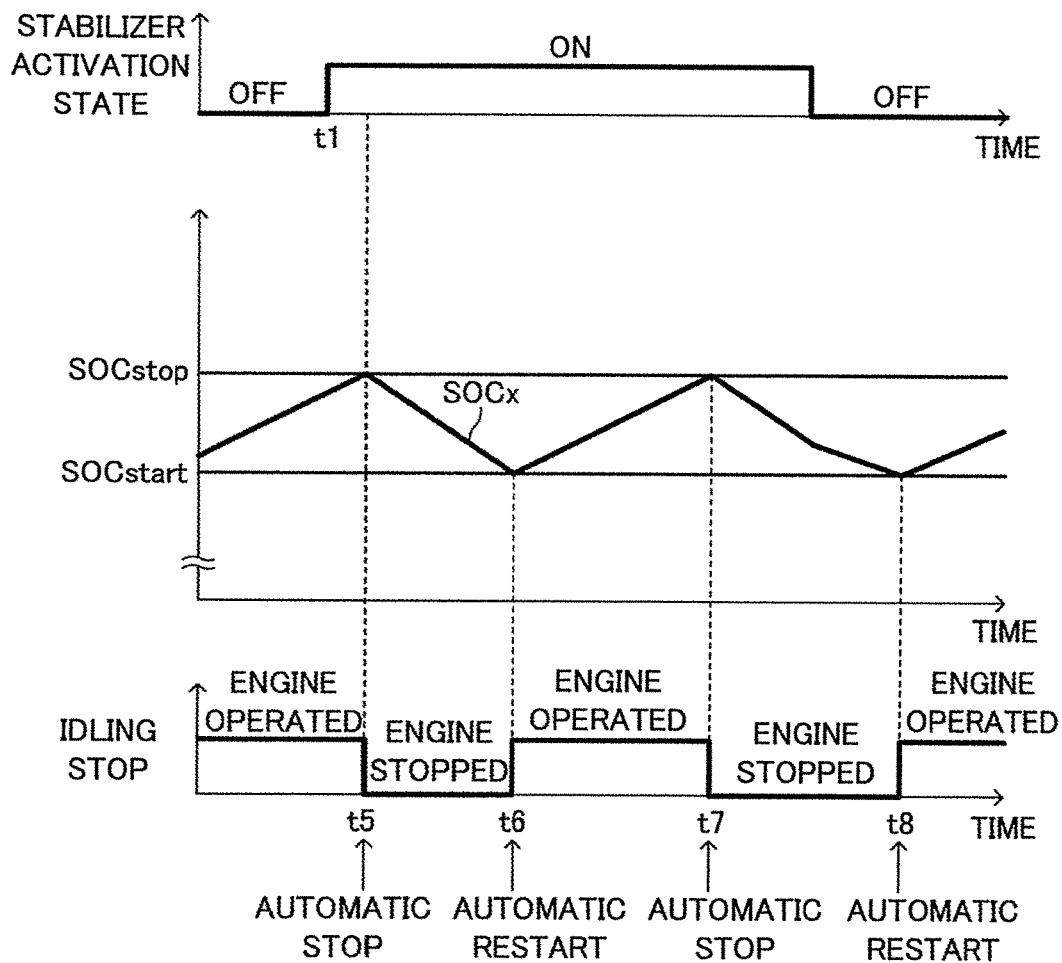
FIG. 9 shows a time chart used for describing an activation of the electric stabilizer and a change timing of an SOC threshold according to a comparative example.

FIG. 9 shows a time chart illustrating a case that the engine stop permission threshold SOCstop is not changed according to a comparative example. In an idling stop control device according to the comparative example, the engine stop permission threshold SOCstop is fixed to the first threshold SOC1. Therefore, when the battery charge value SOCx reaches the engine stop permission threshold SOCstop (=SOC1) at a time t5 after the start of the activation of the stabilizer 31, the operation of the engine 25 is automatically stopped. When the operation of the engine 25 is automatically stopped, an amount of an electric power charged in the battery 41 and capable of being supplied during the execution of the idling stop control is small, compared with the embodiment and depends on a value obtained by subtracting the engine restart threshold SOCstart from the first threshold SOC1 (SOC1−SOCstart). Thus, at a time t6, during the activation of the stabilizer 31, the battery charge value SOCx decreases to below the engine restart threshold SOCstart and thus, the operation of the engine 25 is restarted, that is, the starter 43 activates. Thus, an amount of an electric power supplied to the stabilizer 31 changes during the execution of the rolling motion control and then, the rolling motion state undesirably changes.

<Modified Examples of Idling Stop Control Start and Termination Conditions>

Next, modified examples of the idling stop control start and termination conditions will be described. In the embodiment described above, when the vehicle is decelerated by an operation of the brake pedal, the execution of the idling stop control is started. On the other hand, in the modified example, when the vehicle driver releases the acceleration pedal, the execution of the idling stop control is started.

Figure 7:
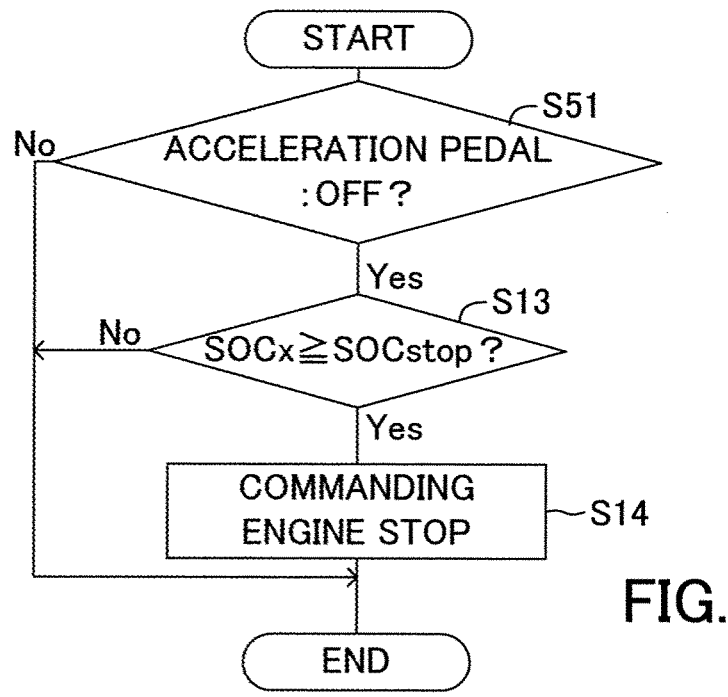
FIG. 7 shows a flowchart of an idling stop start control routine according to a modified example.

FIG. 7 shows an idling stop control start control routine according to the modified example executed by the idling stop ECU 10. In the idling stop control start control routine according to the modified example, the steps S11 and S12 of the idling stop control start control routine according to the embodiment are replaced with a step S51. The remaining steps of the idling stop control start control routine according to the modified example are the same as the steps of the idling stop control start control routine according to the embodiment. Below, a process of the idling stop control start control routine according to the modified example which is different from the process of the idling stop control start control routine according to the embodiment will be described. Processes of the idling stop control start control routine according to the modified example which are the same as the processes of the idling stop control start control routine according to the embodiment, will be omitted. Steps of the idling stop control start control routine according to the modified example which are the same as the steps of the idling stop control start control routine according to the embodiment, are denoted by the reference symbols used for the corresponding steps of the idling stop control start control routine according to the embodiment In the idling stop control start control routine according to the modified example, at the step S51, the idling stop ECU 10 reads a detection signal output from the acceleration pedal sensor 13 and determine whether or not the acceleration pedal is operated. When the acceleration pedal is not operated, the idling stop ECU 10 determines "Yes" at the step S51 and then, the proceeds with the process to the step S13.

Therefore, according to the idling stop control start control routine of the modified example, when the vehicle driver releases the acceleration pedal during the travelling of the vehicle and at this time, the battery charge value SOCx is equal to or larger than the engine stop permission threshold SOCstop, the execution of the idling stop control is started, that is, the automatic stop of the operation of the engine 25 is started. Thus, it is possible to further save the fuel and reduce an amount of the exhaust gas.

Figure 8:
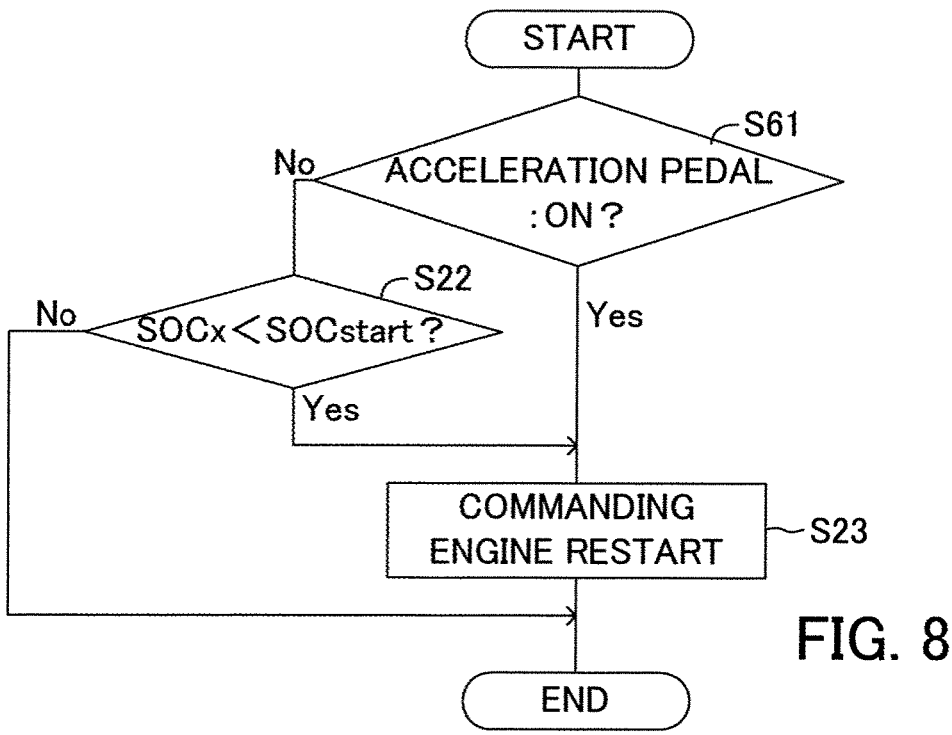
FIG. 8 shows a flowchart of an idling stop termination control routine according to the modified example.

The idling stop control termination condition is also defined on the basis of the operation of the acceleration pedal. FIG. 8 shows an idling stop control termination control routine according to the modified example executed by the idling stop ECU 10. In the idling stop control termination control routine according to the modified example, the step S21 of the idling stop control termination control routine according to the embodiment is replaced with a step S61. The remaining steps of the idling stop control termination control routine according to the modified embodiment are the same as the steps of the idling stop control termination control routine according to the embodiment.

In the idling stop control termination control routine according to the modified example, at the step S61, the idling stop ECU 10 reads a detection signal output from the acceleration pedal sensor 13 and determines whether or not the acceleration pedal is operated. When the acceleration pedal is not operated, the idling stop ECU 10 determines "No" at the step S61 and then, proceeds with the process to the step S22. On the other hand, when the acceleration pedal is operated, the idling stop ECU 10 determines "Yes" at the step S61 and then, proceeds with the process to the step S23.

Therefore, according to the idling stop control termination control routine of the modified example, when the vehicle driver depresses or operates the acceleration pedal during the execution of the idling stop control or when the battery charge value SOCx decreases to below the engine restart threshold SOCstart during the execution of the idling stop control, the idling stop control is terminated. Thus, it is possible to appropriately terminate the idling stop control.

According to the modified examples, a frequency of the execution of the idling stop control during the travelling of the vehicle is large and thus, a frequency of the activation of the stabilizer 31 during the execution of the idling stop control is also large. Therefore, considerably effective is a change of the engine restart threshold SOCstart by the SOC threshold change control routine shown in FIG. 5.

The idling stop control device according to the embodiment of the present specification has been described. However, the present specification is not limited to the embodiment and various modifications can be employed without departing from the object of the present specification.

For example, in the embodiment, the engine stop permission threshold SOCstop, which is one of the idling stop start permission conditions, is changed on the basis of the activation state of the stabilizer 31. However, the engine stop permission threshold SOCstop may be changed on the basis of an activation state of the other electric actuator. For example, the other electric actuator is an actuator that changes a motion state of the vehicle during the travelling of the vehicle such as an electric active suspension device or an electric power steering device.

For example, the electric active suspension device has electric motors in shock absorbers, respectively. The active suspension device generates a damping force by a regenerative control of the electric motors as well as a driving force by supplying an electric power from the in-vehicle electric source to drive-control the electric motors. When the shock absorbers are caused to generate driving forces by drive-controlling the electric motors, a large amount of the electric power is necessary to drive the electric motors. Thus, it is considerably effective that the present specification applies to a case that the electric active suspension device is used as the electric actuator of the present specification.

The electric power steering device has an electric motor mounted on a steering shaft or a steering rack. The electric power steering device generates a steering assist torque depending on a steering operation force generated by the vehicle driver by the electric motor. In particular, a large amount of the electric power is necessary to generate a steering assist torque during the travelling of the vehicle at the extremely low speed. Thus, it is considerably effective that the present specification applies to a case that the electric power steering device is used as the electric actuator of the present specification.

Further, according to the embodiment the engine restart command is sent from the idling stop ECU 10 to the engine ECU 20, thereby to activate the starter 43 by the engine ECU 20. However, alternatively, an activation signal may be output from the idling stop ECU 10 directly to the starter 43.

Figure 10A:
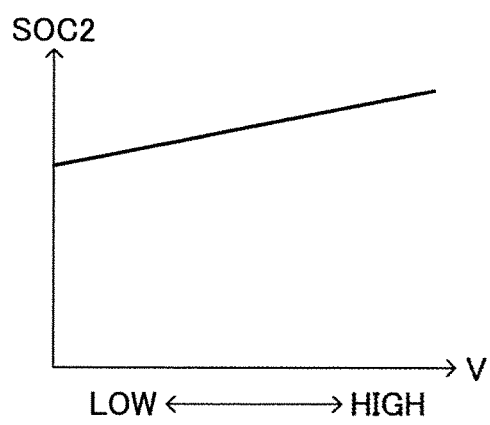
FIG. 10(a) shows a graph of a second threshold setting map.
Figure 10B:
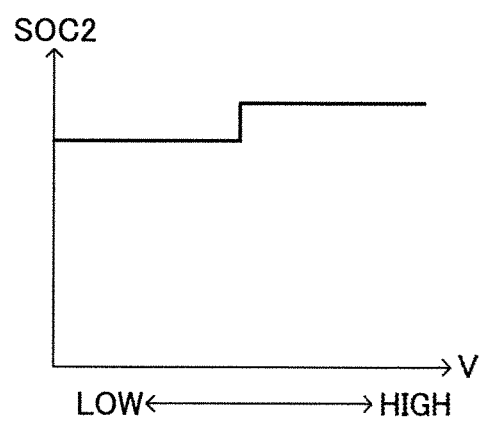
FIG. 10(b) shows a graph of another second threshold setting map.

Further, according to the embodiment the first and second thresholds SOC1 and SOC2 are constant. However, at least one of the first and second thresholds SOC1 and SOC2 may be varied. For example, when the vehicle speed V is large, the second threshold SOC2 may be increased, compared with when the vehicle speed V is small. In this case, for example, the idling stop ECU 10 memorizes a second threshold setting map shown in FIG. 10(a) or 10(b) therein and sets the second threshold SOC2 depending on the vehicle speed V with reference to the second threshold setting map. According to the second threshold setting map shown in FIG. 10(a), as the vehicle speed V increases, the set second threshold SOC2 gradually increases. According to the second threshold setting map shown in FIG. 10(b), as the vehicle speed V increases, the set second threshold SOC2 increases in a step-like manner. In this case, for example, the second threshold SOC2 may be set on the basis of the vehicle speed V detected when the engine restart threshold SOCstart is changed from the first threshold SOC1 to the second threshold SOC2. Alternatively, according to the change of the vehicle speed V, the second threshold SOC2 may be sequentially set depending on the vehicle speed V.

When the vehicle travels at a high speed, a time of activation of the stabilizer 31 tends to increase or an amount of the electric power consumed by activation of the stabilizer 31 tends to increase. Thus, it is possible to appropriately reduce a possibility that the starter 43 activates during the activation of the stabilizer 31 by setting the second threshold SOC2 such that the second threshold SOC2 set when the vehicle speed is large, is larger than the second threshold SOC2 set when the vehicle speed is small. In particular, in a system that starts the execution of the idling stop control upon the release of the acceleration pedal such as the system according to the modified examples shown in FIGS. 7 and 8, the frequency of the activation of the stabilizer 31 during the execution of the idling stop control is large. Thus, in such a system, it is effective to set the second threshold SOC2 such that the second threshold SOC2 set when the vehicle speed is large, is larger than the second threshold SOC2 set when the vehicle speed is small (i.e. the second threshold SOC2 is set so as to increase as the vehicle speed increases or the second threshold SOC2 set when the vehicle speed is a first vehicle speed, is larger than the second threshold SOC2 set when the vehicle speed is a second vehicle speed that is less than the first vehicle speed).

Further, according to the embodiment, the SOC threshold change control routine shown in FIG. 5 is repeatedly executed while the ignition switch is ON. However, the SOC threshold change control routine may be repeatedly executed while at least the idling stop control is not executed, that is, while the idling stop control is not executed and thus, the operation of the engine 25 is not automatically stopped. For example, the SOC threshold change control routine may be repeatedly executed between the time of the termination of the execution of the idling stop control (i.e., the time of the start of the automatic restart of the operation of the engine 25) and the time of the start of the execution of the idling stop control (i.e., the time of the start of the automatic stop of the operation of the engine 25).

What is claimed is:

1. An idling stop control device of a vehicle including:
    an internal combustion engine;
    an in-vehicle electric power source including an electric power generator that generates an electric power by a rotation of the engine and a battery that is charged with an electric power by the electric power generator;
    a starter that starts an operation of the engine with the electric power supplied from the battery; and
    an electric actuator that changes a rolling motion state of a body of the vehicle during a travelling of the vehicle with the electric power supplied from the in-vehicle electric power source,
    the idling stop control device comprising an electronic control unit programmed to execute an idling stop control when a predetermined condition is satisfied during the travelling of the vehicle, the idling stop control including an automatic engine stop control that automatically stops the operation of the engine and an automatic engine restart control that restarts the operation of the engine,
    wherein the electronic control unit is programmed:
    to acquire a remaining electric power amount index value which represents a magnitude of an amount of an electric power remaining in the battery;
    to detect an activation state of the electric actuator;
    to execute the automatic engine stop control to stop the operation of the engine when an automatic engine stop condition, which includes a condition that the remaining electric power amount index value is equal to or larger than an engine stop permission threshold, is satisfied;

to execute the automatic engine restart control to restart the operation of the engine when an automatic engine restart condition which includes a condition that at least the remaining electric power amount index value is smaller than an engine restart threshold after the operation of the engine is automatically stopped, is satisfied; and to change the engine stop permission threshold from a first threshold, which has been set until the start of the activation of the electric actuator, to a second threshold, which is larger than the first threshold, when the electronic control unit does not execute the automatic engine stop control and detects the activation of the electric actuator.

2. The idling stop control device as set forth in claim 1, wherein the electronic control unit is programmed to return the engine stop permission threshold from the second threshold to the first threshold when the electronic control unit detects a termination of the activation of the electric actuator after the electronic control unit changes the engine stop permission threshold from the first threshold to the second threshold.

3. The idling stop control device as set forth in claim 1, wherein the electric actuator is an electric active stabilizer that changes a torsional stiffness of a stabilizer bar by driving an electric motor.

4. The idling stop control device as set forth in claim 1, wherein the electronic control unit is programmed to set the second threshold such that the second threshold set when a speed of the vehicle is a first vehicle speed, is larger than the second threshold set when the speed of the vehicle is a second vehicle speed that is less than the first vehicle speed.

* * * * *

UNITED STATES PATENT AND TRADEMARK OFFICE
CERTIFICATE OF CORRECTION

PATENT NO. : 9,821,811 B2
APPLICATION NO. : 15/051269
DATED : November 21, 2017
INVENTOR(S) : Hiroshi Majima It is certified that error appears in the above-identified patent and that said Letters Patent is hereby corrected as shown below:

In the Specification

In Column 3, Line 63, after "discomfort", insert --.--.

In Column 6, Line 65, delete "lead-add" and insert --lead-acid--, therefor.

Signed and Sealed this
Thirteenth Day of February, 2018

Andrei Iancu
*Director of the United States Patent and Trademark Office*